United States Patent Office 3,714,280
Patented Jan. 30, 1973

3,714,280
CATALYTIC ALKYLATION OF AROMATIC
COMPOUNDS
Paul R. Stapp, Bartlesville, Okla., assignor to
Phillips Petroleum Company
No Drawing. Filed June 9, 1971, Ser. No. 151,588
Int. Cl. C07c 15/16
U.S. Cl. 260—668 C                                10 Claims

ABSTRACT OF THE DISCLOSURE

Esters of aliphatic or aromatic acids are reacted with an aromatic compound in the presence of $BF_3$ to yield diarylalkanes.

This invention relates to a method of preparing a diarylalkane by reacting an ester of an aromatic or aliphatic acid with an aromatic compound in the presence of boron trifluoride.

The preparation of diarylalkanes by the reaction of esters of aromatic or aliphatic acids with aromatic compounds, carried out at moderate temperatures and pressures, in the presence of Lewis type acids is known to the art. In general, the art has recognized that Lewis acids are effective as catalysts for the reactions of esters of aromatic and aliphatic acids with aromatic compounds providing that the Lewis acid is present in excess of molar equivalents sufficient to completely complex with all of the ester reactant.

It is an object of this invention to react esters of aromatic or aliphatic acids with an aromatic compound in the presence of boron trifluoride. Another object of this invention is to prepare diarylalkanes at moderate temperatures and pressures in the presence of moderate catalytic amounts of boron trifluoride.

According to this invention, diarylalkanes can be prepared by the reaction of an ester of an aliphatic or aromatic acid with an aromatic compound in the presence of boron trifluoride.

Suitable reactions of esters of an aromatic or aliphatic acid with an aromatic compound can be represented by the following equations:

(I) 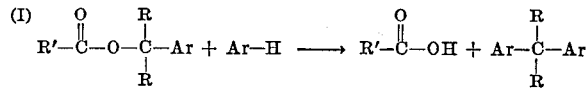

wherein R′ represents a 1 to 20 carbon atom alkyl, cycloalkyl, aryl group or combinations thereof, such as aralkyl, alkaryl, cycloalkylalkyl, alkyl cycloalkyl, cycloalkylaryl, arylcycloalkyl; R represents either hydrogen or a 1 to 20 carbon atom alkyl, cycloalkyl, aryl group or combination thereof; Ar represents a 6 to 20 carbon atom aromatic radical which can be a mono or polycyclic aromatic ring having at least one hydrogen atom attached to a ring carbon atom; and (II) 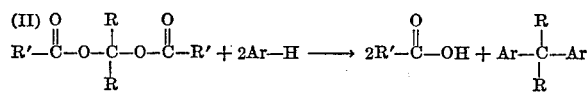

wherein R′, R and Ar are as represented in Equation I.

The R′ group can contain substituents other than hydrogen and carbon atoms, such as a halide, alkoxy, cycloalkoxy, or aryloxy group. The Ar aromatic radical may also contain substituents other than hydrogen and carbon atoms such as a hydroxyl, halide, alkoxy, cycloalkoxy, or aryloxy group. Representative esters of aliphatic and aromatic acids include the following compounds: benzyl acetate, benzyl benzoate, α-methylbenzyl propionate, α-methylbenzyl p-bromobenzoate, benzyl cyclohexanecarboxylate, benzyl phenylacetate, α-methylbenzyl p-toluate, α-cyclohexylbenzyl p-chlorobenzoate, α-phenylbenzyl p-methoxybenzoate, benzyl p-cyclohexyloxybenzoate, α-methylbenzyl p-phenoxybenzoate, p-hydroxybenzyl benzoate, p-bromobenzyl acetate, p-methoxybenzyl butyrate, p-cyclohexyloxybenzyl acetate, 4-phenoxybenzyl benzoate, α-methlylbenzyl 1-naphthoate, benzyl 2-naphthoate, benzyl 9-anthracenecarboxylate, benzyl n-butyrate, α-methylbenzyl o-methoxyphenyl acetate, benzyl chloroacetate, α-ethylbenzyl acetate, benzyl 2,4-dichlorobenzoate, α-propylbenzyl benzoate, benzyl heneicosanoate, 2-naphthylmethyl benzoate, 4-bromo-2-naphthylmethyl p-bromobenzoate, 3-methoxy-2-naphthylmethyl p - methoxybenzoate, 4 - methyl-2-naphthylmethyl acetate, 9 - anthranylmethyl benzoate, 2-bromo-9-anthranylmethyl acetate, 4-methyl-9-anthranylmethyl p-methoxybenzoate, α-methylbenzyl 4-methyl-9-anthracenecarboxylate, α-propylbenzyl 4-bromo-9-anthracenecarboxylate, benzyl 4 - chloro-1-naphthoate, bis(acetoxy)methane, bis(benzoyloxy)methane, bis(butyryloxy)methane, bis(p-chlorobenzoyloxy)methane, bis-(p-toluoyloxy)methane, bis(p - anisoyloxy)methane, bis-(cyclohexanecarbonyloxy)methane, bis(o - methoxybenzoyloxy)methane, and bis(propionyloxy)methane.

Representative aromatic compounds include the following: benzene, naphthalene, anthracene, toluene, methoxybenzene, biphenyl, 4-methylbiphenyl, p-bromobenzene, 2-methyl naphthalene, 4-methoxynaphthalene, 4-phenylnaphthalene, 4-p-toylnaphthalene, 4 - chloronaphthalene, 9-ethylanthracene, 3-methoxyanthracene, 2-phenylanthracene, 5-bromoanthracene.

In the practice of this invention, any amount of boron trifluoride can be added to the reactants. Suitable catalytic amounts include mole ratios of $BF_3$ catalyst of from 0.2 to 100 moles of $BF_3$ per 100 moles of ester reactant. To obtain the economic advantage of reduced catalyst cost, mole ratios of from 0.2 to 50 moles of $BF_3$ per 100 moles of ester reactant are preferably employed.

The reactions of this invention can be carried out in any convenient manner. The ester reactant and aromatic reactant can be brought together in the presence of pure boron trifluoride or in the presence of a boron trifluoride etherate compound. Suitable etherate compounds include those derived from reactions of $BF_3$ with mono or polyethers including acyclic and cyclic ethers, alkyl, aryl, cycloalkyl ethers or combinations thereof containing 2 to 20 carbon atoms per molecule including those containing 1 to 4 ether groups per molecule. Exemplary ethers include dimethyl ether, diethyl ether, dibutyl ether, methyl butyl ether, phenyl methyl ether, diphenyl ether, cyclohexyl methyl ether, tetrahydrofuran, 1,2-dimethoxyethane, 1,4-dioxane, anisole, phenetole and the like. The boron trifluoride etherates can be prepared by using any mole ratio of $BF_3$ to ether including equal molar ratios.

The reactions of this invention can be carried out in the presence of any diluent. Representative diluents include aliphatic, alicyclic or aromatic hydrocarbons and their halogenated derivatives, preferably those free of polar atoms or polar groups of atoms, i.e., oxygen, nitrogen, sulfur, and combinations thereof. Preferred diluents in the practice of this invention are carbon tetrachloride and chloroform.

Any suitable temperature and/or pressure convenient to the reaction of esters and aromatic compounds in the presence of the boron trifluoride catalyst can be employed. Preferably the reaction conditions are such that the reaction mixture is maintained substantially in a liquid phase. These conditions improve the yield of diaryl alkane by eliminating or reducing undesirable side reactions. Suitable reaction temperatures include those within the range of from 0° C. to 300° C. at pressure sufficient to maintain the reaction mixture substantially in liquid phase. A preferred operating temperature range is from 50 to 150° C. The reaction time can be varied widely. Generally, complete conversion of the reactants to the desired end product can be obtained under the reaction conditions described hereinbefore during a time period which varies from $\frac{1}{10}$ of an hour to 24 hours. Frequently, time periods of from 4 to 10 hours are required to optimize ultimate yields.

The mole ratio of ester to aromatic reactant can vary widely. In general, stoichiometric equivalents, i.e., 1 mole of ester per mole of aromatic compound, may be employed with excellent results. Recovery of the diarylalkanes from the reaction media can be carried out by conventional filtration or distillation techniques well known in the art.

The following examples illustrate the best mode of practicing this invention. Accordingly, the scope of this invention is not to be limited thereto.

EXAMPLE I

A 500 ml. round bottomed flask fitted with a water-cooled reflux condenser and nitrogen inlet adapter was charged with a mixture of 100 g. (0.47 mole) benzyl benzoate, 25 ml. (27.5 g., 0.19 mole) boron trifluoride etherate, and 250 ml. benzene. After an 8-hour reflux period under a nitrogen atmosphere, the cooled reaction mixture was poured over ice using ether to aid in the transfer. The organic layer was repeatedly extracted with 10 percent KOH solution until the aqueous extracts were strongly basic. The combined aqueous extracts were acidified with hydrochloric acid to give 55 g. of benzoic acid (96% of theory). The organic phase remaining after the alkaline extraction was dried over anhydrous magnesium sulfate before stripping off ether and benzene on a rotatory evaporator. The residue was distilled at reduced pressure to give 51.2 g. (0.3 mole) diphenylmethane boiling at 146–154° C./25 mm. (68% of theory).

EXAMPLE II

A 500 ml. round bottomed flask fitted with a water-cooled reflux condenser and nitrogen inlet adapter was charged with a mixture of 100 g. (0.47 mole) benzyl benzoate, 25 ml. (27.5 g., 0.19 mole) boron trifluoride etherate, and 250 ml. toluene. After an 8-hour reflux period under a nitrogen blanket, the cooled reaction mixture was poured over ice using toluene and ether to aid in the transfer. The organic layer was separated and repeatedly extracted with 10 percent NaOH solution. The combined aqueous extracts were acidified with hydrochloric acid to give 54.8 g. of benzoic acid (95.8% of theory). The remaining organic phase was dried over anhydrous magnesium sulfate before stripping off ether and toluene on a rotatory evaporator. The residue was distilled at reduced pressure to give 61 g. of tolylphenylmethanes (71.4% of theory).

EXAMPLE III

A 1-liter round bottomed flask fitted with a water-cooled reflux condenser and nitrogen inlet adapter was charged with 75 g. (0.5 mole) benzyl acetate, 15 ml. (16.5 g., 0.12 mole) boron trifluoride etherate, and 400 ml. benzene. After an 8-hour reflux under a nitrogen atmosphere, the cooled reaction mixture was poured into water and the layers separated. The organic phase was washed with water, aqueous sodium carbonate, and dried over anhydrous magnesium sulfate. After filtering off the magnesium sulfate, benzene was removed by atmospheric distillation, and the residue was distilled at reduced pressure to give 55.1 g. diphenylmethane (129–136° C./12 mm.) (66% of theory).

EXAMPLE IV

A 1-liter round bottomed flask fitted with a water-cooled reflux condenser and nitrogen inlet adapter was charged with a mixture of 100 g. (0.76 mole) methylene diacetate, 10 ml. (11.1 g., 0.08 mole) boron trifluoride etherate, and 500 ml. toluene. After a 6-hour reflux under a nitrogen blanket, the cooled reaction mixture was washed with water, aqueous sodium carbonate, and dried over anhydrous magnesium sulfate. After removal of the magnesium sulfate by filtration, the toluene was distilled off at atmospheric pressure. The residue was distilled under reduced pressure to give 46 g. of ditolylmethanes (141–146° C./10 mm.). The recovered methylene diacetate (58–75° C./10 mm.) weighed 40.2 g. (0.45 mole) (59.8% conversion). The ultimate yield of ditolylmethanes was 52%, and analysis by gas chromatography and nuclear magnetic reasonance indicated the following product composition:

| Ditolylmethanes: | Percent |
|---|---|
| 2,2' | 5 |
| 2,3' | 10 |
| 2,4' | 37 |
| 3,3' | 4 |
| 3,4' | 10 |
| 4,4' | 33 |

The diarylalkanes prepared in accordance with this invention can be used as chemical intermediates in the preparation of other chemicals and/or as selective solvents, diluents and the like in commercial application well known to the art.

I claim:

1. A method of preparing diarylalkanes which comprises contacting an ester of an aliphatic or aromatic acid with an aromatic compound in the presence of boron trifluoride.

2. A method in accord with claim 1 wherein the ester of an aliphatic or aromatic acid is represented by the formula:

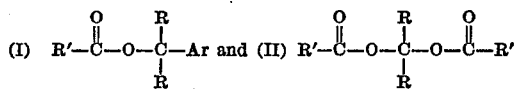

wherein R' represents a 1 to 20 carbon atom alkyl, cycloalkyl, aryl group or combination thereof; R represents either hydrogen or a 1 to 20 carbon atom alkyl, cycloalkyl, aryl group or combination thereof; Ar represents a 6 to 20 carbon atom aromatic radical having at least one hydrogen atom attached to a ring carbon atom; and the aromatic compound is a mono or polycyclic aromatic ring having at least one hydrogen atom attached to a ring carbon atom.

3. A method in accord with claim 2 wherein boron trifluoride is present in catalytic amounts.

4. A method in accord with claim 3 wherein the boron trifluoride is present in an amount of from 0.2 to 50 moles per 100 moles of ester reactant.

5. A method in accord with claim 4 wherein the boron trifluoride is present in etherate form.

6. A method in accord with claim 5 wherein the contact is carried out within a temperature range of from 0 to 300° C. in the presence of an inert diluent.

7. A method in accord with claim 6 wherein the ester is benzylbenzoate and aromatic compound is benzene.

8. A method in accord with claim 6 wherein the ester is benzylbenzoate and the aromatic compound is toluene.

9. A method in accord with claim 6 wherein the ester is benzylacetate and the aromatic compound is benzene.

10. A method in accord with claim 6 wherein the ester is methylene diacetate and the aromatic compound is toluene.

References Cited

UNITED STATES PATENTS 2,439,228   4/1948   Sturrock et al. ____ 260—668 C
2,848,509   8/1958   Toland et al. ____ 260—668 C

OTHER REFERENCES

McKenna et al.: 59 JACS, 1204–5, July 1937.
Price et al.: 60 JACS, 2499–2502, October 1938.
Chem. Abstr., 48 8184 (1954).
Chem. Abstr., 27 975 (1933).

CURTIS R. DAVIS, Primary Examiner